April 29, 1952 A. F. STETSON 2,594,596
POWER SPRINKLER SHUTOFF
Filed March 22, 1946 2 SHEETS—SHEET 1
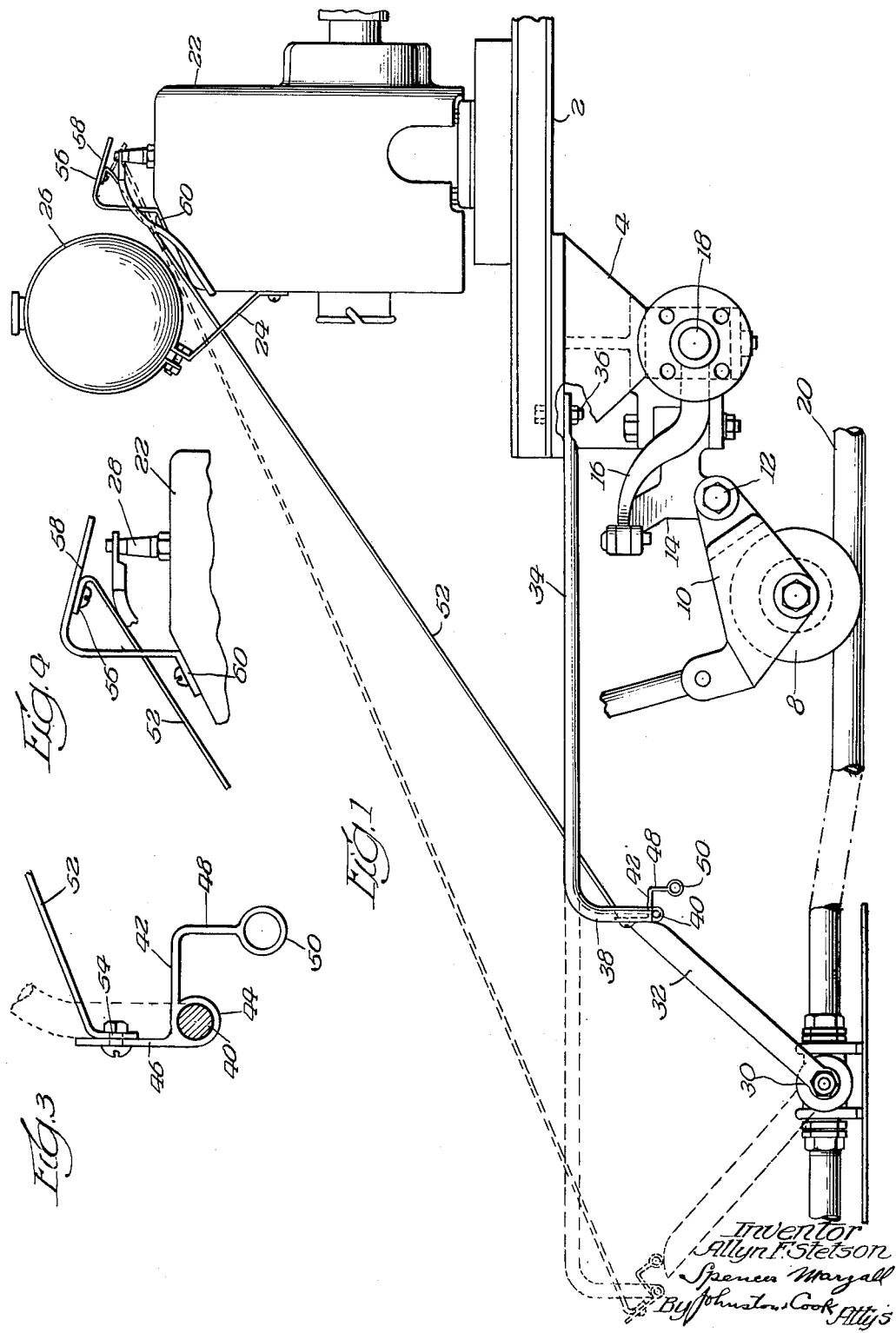

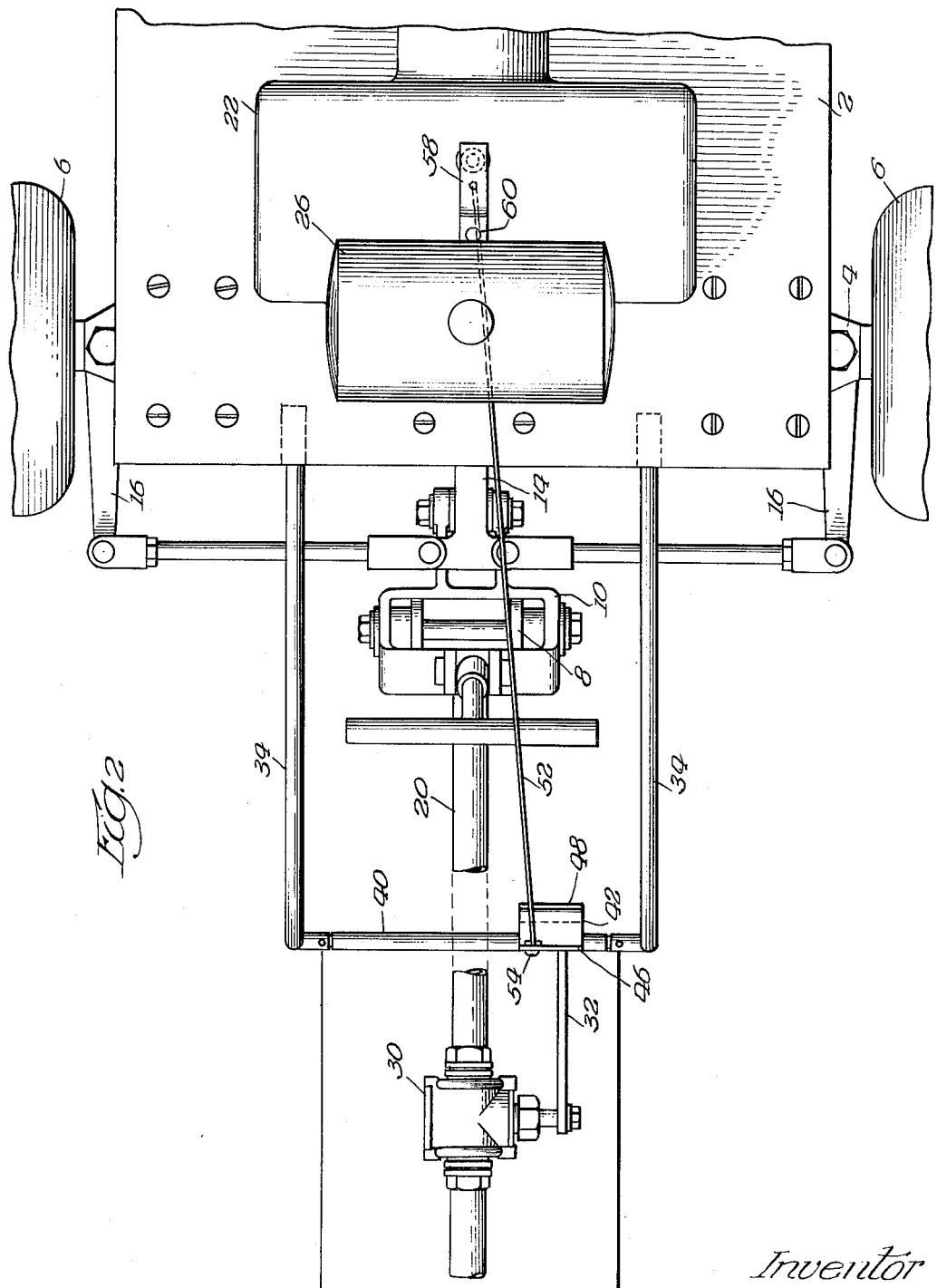

Patented Apr. 29, 1952

2,594,596

UNITED STATES PATENT OFFICE 2,594,596

POWER SPRINKLER SHUTOFF

Allyn F. Stetson, Chicago, Ill.

Application March 22, 1946, Serial No. 656,190

10 Claims. (Cl. 299—47)

This invention relates in general to power operated traveling lawn sprinklers, and is particularly directed to an automatic shut-off mechanism for stopping both the flow of water and the power means when the apparatus has reached the end of its travel.

Heretofore in lawn sprinklers of this general type, the power to drive the machine has been supplied by water under pressure. This type of power supply has various disadvantages, such as uneven water pressure, which may cause the machine to stall before it has reached the end of its travel. I provide positive power means, such as a gasoline engine, to drive the entire apparatus and the details of which may be more clearly understood by reference to my copending application, Serial No. 656,189, filed March 22, 1946, which has matured into U. S. Patent 2,474,071, issued June 21, 1949.

In the operation of these machines it is customary to start the apparatus a considerable distance away from the source of water supply, which necessitates the use of a long hose connected at one end to the source of water supply, and at the other end to the sprinkler. A guide wheel is provided which follows the hose and guides the machine from its starting point back to the source of water supply. When the apparatus is being driven by the power supplied by water under pressure and the machine reaches the end of its travel, it has been customary to cause the machine to actuate a valve in the water line to automatically shut off the water supply at the end of travel. In that type of machine, the shutting off of the water supply will also cause the machine to stop moving, because the driving means is the water under pressure and when the water supply stops, the machine will cease to function.

The problem becomes more complicated when the source of driving power for the machine is a positive means such as a gasoline engine, or an electric motor, since the mere shutting off of the water will not prevent further forward movement of the machine.

It is therefore one of the principal objects of my invention to provide automatic shut-off means for not only cutting off the water supply, but also the power means in a power operated sprinkler which is driven by means other than water under pressure.

Another object of the invention is to provide, in a power operated sprinkler, means which will automatically shut off the water supply at the end of travel of the machine, and which will also automatically operate to shut off the engine driving the machine.

A further object of the invention is to provide means on the sprinkler which is connected to the engine and which will be actuated by the shut-off valve in the water supply line to also shut off the motor.

Still another object of the invention is to provide, in a power sprinkler, where the power means is a gasoline engine, automatic shut-off means which will simultaneously shut off the supply of water to the sprinkler and ground the spark plugs of the engine so that the movement of the machine will stop simultaneously with the cutting off of the water supply.

Other objects and advantages of the invention will be apparent by reference to the following description in conjunction with the accompanying drawings in which:

Fig. 1 is a side elevation of the forward end of the machine showing the operation of the shut-off mechanism;

Fig. 2 is a plan view of the mechanism shown in Fig. 1;

Fig. 3 is an enlarged detail of a part of the automatic shut-off means adjacent the valve in the water supply line, and Fig. 4 is an enlarged detail of that part of the automatic shut-off means for grounding the spark plug and cutting off the engine.

Briefly described, I provide a bumper arrangement in the form of a transverse rod mounted at the forward end of the apparatus which is adapted to contact an arm operating the shut off valve in the water supply line. This arm will also actuate a device on the rod connected to a spring clip on the engine to ground out the spark plugs and shut off the engine.

Referring now more particularly to the drawings, and especially to Fig. 1, the entire apparatus is supported by the main platform 2 which has at its forward end downwardly extending brackets 4, supporting wheels 6. A guide wheel 8 is also provided at the forward end, which may either be a grooved wheel, or constructed with spaced apart sides, and which is mounted on a forwardly extending bracket 10, pivotally secured at 12 to a link 14. Rearwardly extending links 16 are connected at their forward ends to the link 14, and at their rear ends to the axle 18, whereby any turning of the guide wheel 8 will rotate the links 14 and 16 to move the wheels 6, all as more clearly explained in my above referred to copending application.

The water supply line, or hose 20, is secured at one end to a source of water supply and at its other end to the sprinkling mechanism on the machine (not shown). This hose is received between the sides of the guide wheel 8, and as the machine moves forwardly, it will follow the direction of the hose from its starting point to the end of travel, which will usually be a point adjacent the source of water supply.

While the power supply means to drive the machine may be of any suitable character, for purposes of illustration the preferred embodiment of the invention proposes the use of a gasoline engine 22 mounted on the supporting platform 2. A bracket 24 supports a gasoline tank 26, and a spark plug 28 is located at the top of the engine. While it may be desirable to provide a larger engine with more than one spark plug, I have found this unnecessary, since sufficient power can be obtained with a small engine.

A shut-off valve 30 is located in the water supply line, or hose 20, near the source of water supply, and may be actuated by an arm 32 connected thereto and extending upwardly therefrom. At the forward end of the platform 2 I provide a bumper arrangement consisting of forwardly extending arms 34 secured at their rear ends to the platform at 36, the forward ends of which are turned downwardly as at 38, and are connected by means of the rod 40. As the machine moves forwardly and nears the end of its travel, the rod 40 will be moved against the arm 32 and move it to the dotted line position shown in Fig. 1, which will automatically cut off the water supply.

To also shut off the engine at the same time, I provide a bracket and link means, the details of which will be more clearly seen by reference to Figs. 3 and 4. While this bracket may assume any one of a number of forms, I have found the most satisfactory to be that where the bracket has a horizontal plate 42 having a sleeve 44 surrounding the rod 40 to pivot thereon. The plate 42 terminates at one side thereof in an upturned portion 46, and at its other side in a downturned portion 48, this latter having an enlarged circular portion 50 along the lower edge thereof.

A wire, or other form of connecting link 52, is secured at one end thereof to the upwardly extending portion 46 of the bracket, as at 54, and the other end is fastened, as at 56, to a spring steel clip 58 (see Fig. 4). This clip has one end thereof extending over the spark plug 28, and has its other end 60 secured to the upper side of the engine 22. It will be clear that a downward movement of the clip 58 against the spark plug 28 will ground out the spark plug, and cause the motor to stop.

This movement of the clip 58 is accomplished by a counter-clockwise rotation of the bracket 42. It will be noted that the arm 32 has a curved portion at its outer end which acts as a cam, against which the bracket 42 is adapted to move. As the machine moves forwardly and the arm 32 is rotated by reason of the rod 40 bearing thereagainst, the enlarged portion 50 of the bracket 42 will come against this cam surface and be rotated to the position shown in dotted lines in Fig. 1. This rotation will exert a pull on the connecting wire or link 52, and pull the steel spring clip downwardly in contact with the spark plug 28, thus grounding it and turning off the motor.

It will be evident from the foregoing that I have provided novel means for not only automatically shutting off the water supply in a power operated sprinkler, but also positive means actuated by the shutting off of the water to also shut off the engine when the sprinkler reaches the end of its travel. If power means other than a gasoline engine is used, such as an electric motor, the upper end of the link 52 can be caused to actuate a switch.

It will also be evident that other changes in the specific form and construction of the various parts can be made without in any way departing from the spirit or scope of the invention, and without sacrificing any of the attendant advantages thereof.

Having thus described my invention what I claim as new and desire to secure by Letters Patent of the United States is:

1. In a traveling power operated sprinkler having a conduit connected to a source of water supply a separate power supply to drive the sprinkler, means operatively associated with said sprinkler to shut off the separate power supply, a valve in the conduit, and arm means on said sprinkler to close said valve and shut off the water supply, and movable bracket means on said arm means to actuate said first named means to shut off the separate power supply.

2. In a traveling power operated sprinkler having a conduit connected to a source of water supply, a separate power supply to drive the sprinkler, means mounted on the sprinkler adapted to shut off the separate power supply, a valve in the conduit, and forwardly positioned arm means actuated by movement of the sprinkler to close said valve and shut off the water supply, and movable bracket means on said arm means to actuate said first named means to shut off the separate power supply.

3. In a traveling power operated sprinkler having a conduit connected to a source of water supply, a separate power supply to drive the sprinkler, circuit grounding means mounted on the sprinkler adapted to shut off the separate power supply, a valve in the conduit, a bumper arrangement on the sprinkler adapted to close said valve and shut off the water supply at the end of travel of the sprinkler, and means to actuate said first named means to shut off the separate power supply when said water supply is shut off.

4. In a traveling power operated sprinkler having a separate power supply to drive the sprinkler, a conduit connected to a source of water supply, a device for shutting off said separate power supply when the sprinkler reaches the end of its travel, comprising a movable bracket, a member mounted on the power supply means adapted to be moved to cause the power supply to be shut off, a link connecting said bracket with said member, and means positioned on said conduit to move said bracket at the end of travel of the sprinkler, whereby the link connected thereto will actuate said member to shut off the power supply.

5. In a traveling power operated sprinkler an internal combustion engine mounted thereon to drive the sprinkler, a device for shutting off the engine when the sprinkler reaches the end of its travel, comprising a movable bracket on the sprinkler, a member mounted on the engine adjacent the spark plug thereof adapted to ground out the spark plug and stop the engine, a link connecting said bracket and member, and means to move said bracket at the end of travel of the sprinkler, whereby the link connected thereto will actuate said member to shut off the engine.

6. In a traveling power operated sprinkler having a separate power supply to the drive the sprinkler, a conduit connected to a source of water supply, a device for shutting off said separate power supply when the sprinkler reaches the end of its travel, comprising a bracket rotatably mounted on the sprinkler, a member mounted on the power supply means adapted to be moved to cause the power supply to be shut off, a link connecting said bracket and member, and means positioned on said conduit to rotate said bracket at the end of travel of the sprinkler, whereby the link connected thereto will actuate said member to shut off the power supply.

7. In a traveling power operated sprinkler an internal combustion engine mounted thereon to drive the sprinkler, a device for shutting off the engine when the sprinkler reaches the end of its travel, comprising a rotatable bracket on the sprinkler, a spring clip mounted on the engine adjacent the spark plug thereof adapted to ground out the spark plug and stop the engine, a link connecting said bracket and spring clip, and means to rotate said bracket at the end of travel of the sprinkler, whereby the link connected thereto will move said spring clip against the spark plug and shut off the engine.

8. In a traveling power operated sprinkler having a conduit connected to a source of water supply, a separate power supply to drive the sprinkler, a valve in said conduit, an arm secured to said valve and extending upwardly therefrom and adapted to move said valve to open and closed positions, a movable bracket on the sprinkler, a member mounted on said separate power supply means adapted to be moved to cause the power supply to be shut off, and a link connecting said bracket and said member, said bracket adapted to contact and move said arm to shut off the water supply at the end of travel of the sprinkler, whereby the bracket and link connected thereto will also be moved to actuate said member and shut off the power supply.

9. In a traveling power operated sprinkler having a conduit connected to a source of water supply a separate power supply to drive the sprinkler, a valve in said conduit, an arm secured to said valve and movable to shut off the water supply, a bumper arrangement on the sprinkler adapted to be moved against said arm to close said valve at the end of travel of the sprinkler, a movable bracket on said bumper adapted to be moved by contact with said arm, a member on said separate power supply means adapted to be moved to cause the power supply to be shut off, and a link connecting said bracket and said member whereby said member will be moved simultaneously with said bracket, to thereby shut off said separate power supply with said water supply.

10. In a traveling power operated sprinkler having a conduit connected to a source of water supply an internal combustion engine mounted thereon to drive the sprinkler, a valve in said conduit, an arm secured to said valve and movable to shut off the water supply, a bumper arrangement on the sprinkler adapted to come against and move said arm to close said valve at the end of travel of the sprinkler, a bracket on said bumper adapted to be rotated by contact with said arm, a spring clip mounted on said engine adapted to be moved against the spark plug thereof to ground out the spark plug and stop the engine, and a link connecting said bracket and said spring clip movable upon rotation of said bracket, to thereby actuate said spring clip and stop the engine when said water supply is shut off.

ALLYN F. STETSON.

REFERENCES CITED

The following references are of record in the file of this patent:

UNITED STATES PATENTS

| Number | Name | Date |
| --- | --- | --- |
| 1,658,202 | Jones | Feb. 7, 1928 |
| 1,675,025 | Gebhardt | June 26, 1928 |
| 1,869,114 | Phelps | July 26, 1932 |
| 1,975,596 | Adamson | Oct. 2, 1934 |
| 2,256,838 | Adamson | Sept. 23, 1941 |
| 2,475,388 | Hart et al. | July 5, 1949 |